US011529831B2

(12) United States Patent
McCauley et al.

(10) Patent No.: US 11,529,831 B2
(45) Date of Patent: Dec. 20, 2022

(54) CENTRAL TIRE INFLATION SYSTEM

(71) Applicant: Airdown, Inc., Cape Canaveral, FL (US)

(72) Inventors: Scott McCauley, Cape Canaveral, FL (US); Alfred Robert Tomlinson, Cape Canaveral, FL (US)

(73) Assignee: Airdown, Inc., Beverly Hills, FL (US)

( * ) Notice: Subject to any disclaimer, the term of this patent is extended or adjusted under 35 U.S.C. 154(b) by 213 days.

(21) Appl. No.: 16/700,082

(22) Filed: Dec. 2, 2019

(65) Prior Publication Data

US 2020/0101803 A1 Apr. 2, 2020

Related U.S. Application Data

(63) Continuation of application No. 15/660,065, filed on Jul. 26, 2017, now Pat. No. 10,493,808.

(51) Int. Cl.
*B60C 23/00* (2006.01)
*B60C 29/06* (2006.01)
*B60S 5/04* (2006.01)

(52) U.S. Cl.
CPC .. *B60C 23/00354* (2020.05); *B60C 23/00363* (2020.05); *B60C 29/066* (2013.01); *B60C 29/068* (2013.01); *B60C 2200/06* (2013.01); *B60S 5/046* (2013.01)

(58) Field of Classification Search
CPC ............ B60C 23/003; B60C 23/00354; B60C 23/00363
See application file for complete search history.

(56) References Cited

U.S. PATENT DOCUMENTS

| 5,180,456 | A | | 1/1993 | Schultz et al. | |
|---|---|---|---|---|---|
| 5,244,027 | A | * | 9/1993 | Freigang | B60C 23/003 152/416 |
| 5,253,687 | A | * | 10/1993 | Beverly | B60C 23/003 152/416 |
| 5,261,471 | A | * | 11/1993 | Freigang | B60C 23/003 152/415 |
| 5,452,753 | A | * | 9/1995 | Olney | B60C 23/004 152/417 |
| 5,544,688 | A | * | 8/1996 | Freigang | B60C 23/003 152/415 |
| 5,629,873 | A | | 5/1997 | Mittal et al. | |
| 5,629,874 | A | * | 5/1997 | Mittal | B60C 23/00354 702/140 |

(Continued)

*Primary Examiner* — Kip T Kotter
(74) *Attorney, Agent, or Firm* — Kelly G. Swartz; Widerman Malek, PL

(57) ABSTRACT

A central tire inflation system configured to monitor and maintain an air pressure on the tires of a vehicle includes a housing, a central processing unit, a controller, and a valve. The housing has a plurality of walls and a bottom forming an interior volume. The central processing unit has the necessary electronics to receive, store, transmit and manipulate data. The controller has a plurality of modes of operation wherein the modes of operation include default parameters for air pressure within the tires of the vehicle. The valve is configured to direct air flow as required into or out of the tires, the valve being operably coupled to the controller. The central tire inflation system is configured to monitor air pressure of the tires and provide inflation or deflation thereof based the mode of operation.

19 Claims, 5 Drawing Sheets

(56) References Cited

U.S. PATENT DOCUMENTS

| | | |
|---|---|---|
| 7,051,585 B2 | 5/2006 | Claussen et al. |
| 7,686,051 B2 | 3/2010 | Medley et al. |
| 9,248,707 B2 | 2/2016 | Zhou et al. |
| 9,415,645 B2 | 8/2016 | Racine et al. |
| 9,561,694 B2 | 2/2017 | Ingram et al. |
| 2010/0147387 A1* | 6/2010 | Medley ................ F16K 27/003 137/224 |
| 2013/0282232 A1* | 10/2013 | Medley ................ B60C 23/002 152/427 |
| 2018/0104994 A1 | 4/2018 | Lin et al. |
| 2018/0186198 A1 | 7/2018 | Zhou et al. |

* cited by examiner

CENTRAL TIRE INFLATION SYSTEM

RELATED APPLICATIONS

This is a continuation of U.S. patent application Ser. No. 15/660,065 titled Central Tire Inflation System, the entire contents of which are incorporated herein by reference.

FIELD OF THE INVENTION

The present invention relates generally to tire inflation and deflation systems, more specifically but not by way of limitation a central tire inflation system for vehicles that includes air shutoff valves inside each wheel of the vehicle and further provides adjustability to accommodate alternate size vehicles.

BACKGROUND

Central tire inflation systems are commonly utilized on large commercial trucks to increase the performance of the truck across alternate terrain types. By way of example but not limitation, inflation systems are common on military vehicles that must traverse alternate terrains during a mission wherein the vehicle may be traversing across loose sand to asphalt in a single trip. It is desirable during traversing across different terrains such as the aforementioned to inflate and/or deflate the tires so as to optimize traction and other performance parameters for the instant terrain.

One issue with existing tire inflation systems is the use of external shut off valves. Utilization of external shutoff valves prevents the ability for the central tire inflation system to maintain a minimum tire pressure in the event of a tire emergency. If a tire suffers a catastrophic failure on a conventional central tire inflation system the tire can completely lose all of its air pressure, which can cause the tire to dislodge from the wheel and cause more damage to the vehicle. A further issue with existing central tire inflation systems is their inability to adjust to various vehicle wheel sizes and bolt patterns. Existing systems are limited to the wheel sizes and are unable to adjust to accommodate alternate wheel sizes restricting the ability for the central tire inflation system to be moved between vehicles. Lastly, current technology does not permit adjustment of the release valve to prevent tires from going flat and further ensure a minimum tire pressure is maintained.

Accordingly, there is a need for a central tire inflation system that is configured to provide adjustability to accommodate alternate wheel sizes and further provide an adjustable valve means to inhibit a tire from completing losing air pressure.

SUMMARY OF THE INVENTION

It is the object of the present invention to provide a central tire inflation system configured to ensure the tires of a vehicle will maintain a minimum tire pressure that includes an assembly having a central housing with opposing arms extending outward therefrom.

Another object of the present invention is to provide a central tire inflation system operable to provide control of the tire pressure of a vehicle wherein the central housing has disposed in the cavity thereof an air check valve.

A further object of the present invention is to provide a central tire inflation system configured to ensure the tires of a vehicle will maintain a minimum tire pressure and further provide increase or decrease thereof that includes a controller operable to provide operation of the central tire inflation system.

Still another object of the present invention is to provide a central tire inflation system operable to provide control of the tire pressure of a vehicle wherein the controller includes a valve having intake and release ports operably coupled thereto and further includes a central processing unit.

An additional object of the present invention is to provide a central tire inflation system configured to ensure the tires of a vehicle will maintain a minimum tire pressure and further provide increase or decrease thereof that further includes a graphical display unit operably coupled to the controller providing a means to interface with the central tire inflation system.

Yet a further object of the present invention is to provide a central tire inflation system operable to provide control of the tire pressure of a vehicle wherein the graphical display unit provides a plurality of operation screens configured to deliver a multitude of functions for the central tire inflation system.

Another object of the present invention is to provide a central tire inflation system configured to ensure the tires of a vehicle will maintain a minimum tire pressure and further provide increase or decrease thereof wherein the central processing unit is further configured to maintain a data log of all activities of the central tire inflation system.

Still and additional object of the present invention is to provide a central tire inflation system operable to provide control of the tire pressure of a vehicle wherein the air check valve includes an adjustment screw integrated into the rear surface of the central housing to establish the minimum tire pressure.

An additional object of the present invention is to provide a central tire inflation system configured to ensure the tires of a vehicle will maintain a minimum tire pressure and further provide increase or decrease thereof wherein the central housing includes an air port fluidly coupled to the inflation stem of each tire.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
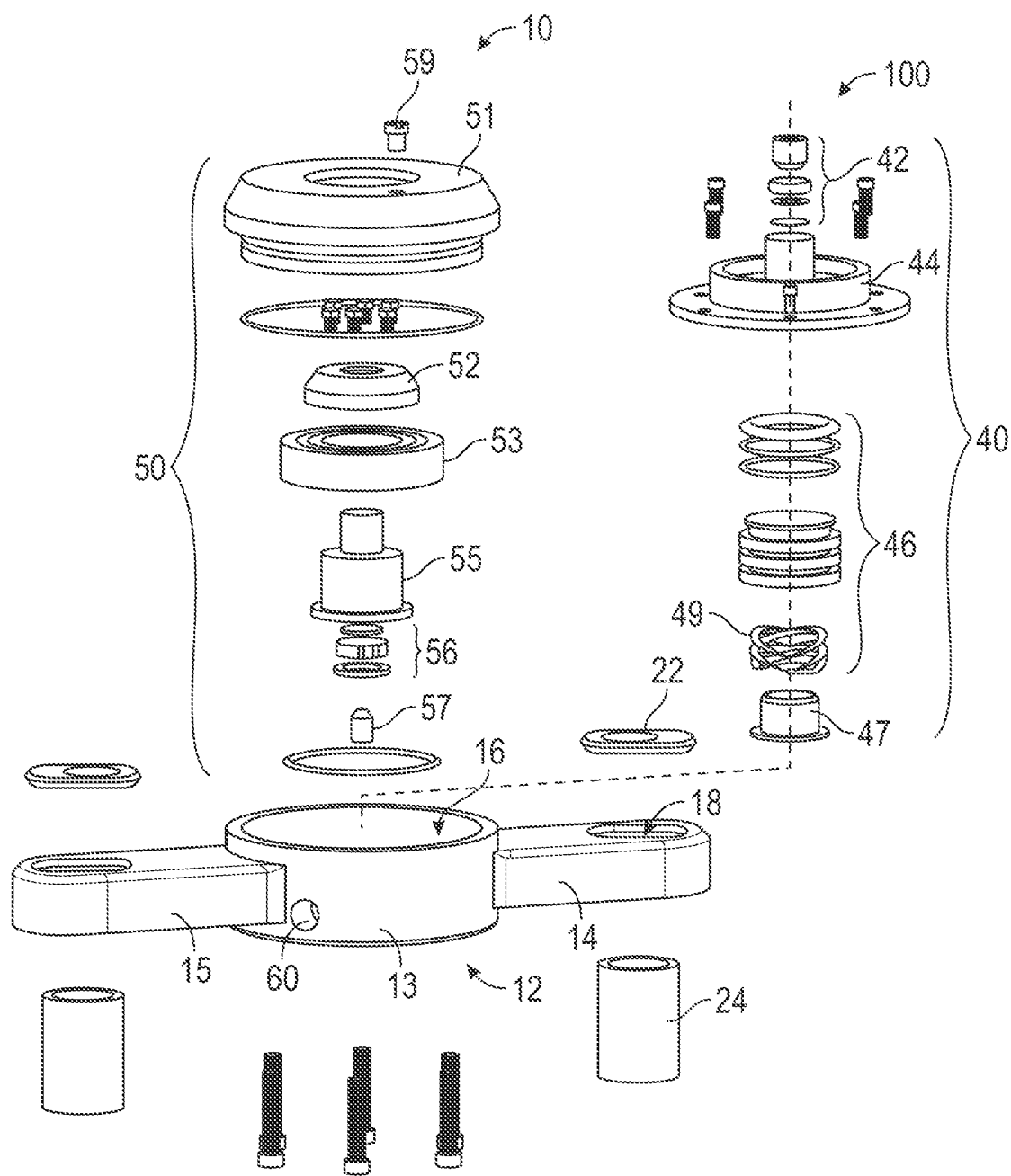
FIG. 1 is an exploded view of the wheel assembly preferred embodiment of the present invention.

Referring now to the drawings submitted herewith, wherein various elements depicted therein are not necessarily drawn to scale and wherein through the views and figures like elements are referenced with identical reference numerals, there is illustrated a central tire inflation system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
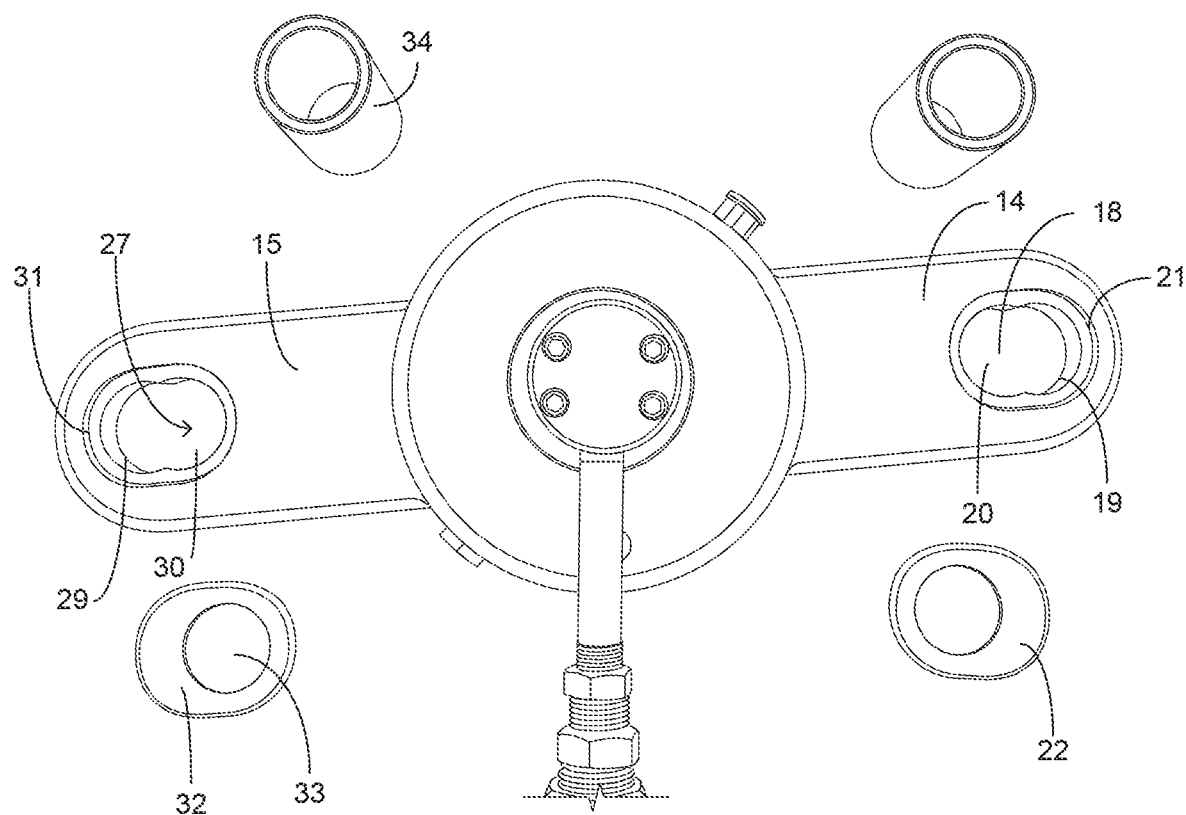
FIG. 2 is a top view of the wheel assembly of the present invention.

Referring now in particular to FIGS. 1 and 2 herein, the central tire inflation system 100 further includes a wheel assembly 10. The wheel assembly is provided to be mounted to each wheel of a vehicle in which the central tire inflation system 100 has been installed. The wheel assembly 10 includes a housing 12 wherein the housing 12 includes a central portion 13 and a first arm member 14 and second arm member 15. The housing 12 is manufactured from a suitable durable material such as but not limited to aluminum. The central portion 13 of the housing is annular in shape and includes cavity 16. Integrally formed with the central portion 13 of the housing 12 are first arm member 14 and second arm member 15. The first arm member 14 and second arm member 15 are formed on opposing sides of the central portion 13 of the housing 12. First arm member 14 and second arm member 15 function to span substantially across a vehicle wheel so as to be operably coupled thereto. It is contemplated within the scope of the present invention that the housing 12 could be manufactured in alternate sizes so as to accommodate vehicle wheels having different diameters. First arm member 14 further includes aperture 18 journaled therethrough distal to the central portion 13. The aperture 18 is a joined circle configuration having a first portion 19 and second portion 20 wherein the aperture 18 is generally oval in shape. The joined circle configuration of the aperture 18 provides a technique for the wheel assembly 10 to be operably coupled to various lug patterns of wheels of vehicles. The joined circle configuration permits lateral adjustment of a fastening lug to provide optimum positioning. The aperture 18 further includes ledge 21 wherein ledge 21 is circumferentially disposed around aperture 18. Ledge 21 functions to releasably secure adapter ring 22 therein. Ring adapter 22 further includes hole 23 suitable in size so as to accommodate a bolt therethrough. Operably coupled to aperture 18 is wheel mount 24. Wheel mount 24 is cylindrical in shape being hollow so as to accommodate a bolt therethrough. Second arm member 15 further includes aperture 27 journaled therethrough distal to the central portion 13. The aperture 27 is a joined circle configuration having a first portion 29 and second portion 30 wherein the aperture 27 is generally oval in shape. The aperture 27 further includes ledge 31 wherein ledge 31 is circumferentially disposed around aperture 27. Ledge 31 functions to releasably secure adapter ring 32 therein. Ring adapter 32 further includes hole 33 suitable in size so as to accommodate a bolt therethrough. Operably coupled to aperture 27 is wheel mount 34. Wheel mount 34 is cylindrical in shape being hollow so as to accommodate a bolt therethrough. Wheel mount 34 in combination with wheel mount 24 functions to provide a standoff mounting technique for housing 12. Further, the joined circle configurations of apertures 18,27 provide the ability to laterally position a fastener therein so as to accommodate alternate wheel diameters.

Disposed within cavity 16 of the central portion 13 are the check valve assembly 40 and the bearing/cap assembly 50. The check valve assembly 40 functions as a conventional check valve allowing air flow into the wheel assembly 10 and is configured to maintain a minimum tire pressure to a tire on a wheel to which the wheel assembly 10 is mounted. The check valve assembly 40 includes upper seal/spring group 42. A seat cup assembly 44 is further included. The lower seal/spring group 46 is operably coupled to seat cup 44 and is secured utilizing that washer 47. As will be further discussed herein, the check valve assembly 40 provides an adjustable technique to maintain a minimum air pressure for all tires to which the wheel assembly 10 is fluidly coupled. Spring 49 is configured to have adjustable tension so as to allow a user of the central tire inflation system 100 to set a minimum air pressure for the tires operably coupled thereto. By way of example but not limitation, it is contemplated within the scope of the present invention that the spring 49 has a tension so as to inhibit a pressure lower than 20 PSI within the tires.

The bearing/cap assembly 50 is operably disposed within the cavity 16 of the central portion 13. The bearing/cap assembly 50 includes the following elements: cover 51, cap 52, roller bearing 53, tube 55, retaining ring assembly 55, seal group 56, and adjustment screw 57. Seal group 56 comprises an o-ring, seal washer, and retaining ring. A grease fitting 59 is operably coupled to cover 51 and provides an operable coupling technique to inject the necessary lubricant into the cavity 16 of the central portion 13. The aforementioned elements of the bearing/cap assembly 50 provide rotatable coupling of the check valve assembly 40 within the cavity 16 of the central portion 13. It is contemplated within the scope of the present invention that alternate configurations of the bearing/cap assembly 50 could be provided with alternate elements and still achieve the desired functionality discussed herein. Central portion 13 includes aperture 60 that is a port for air to be fluidly directed to a tire to which the wheel assembly 10 is mounted.

Figure 3:
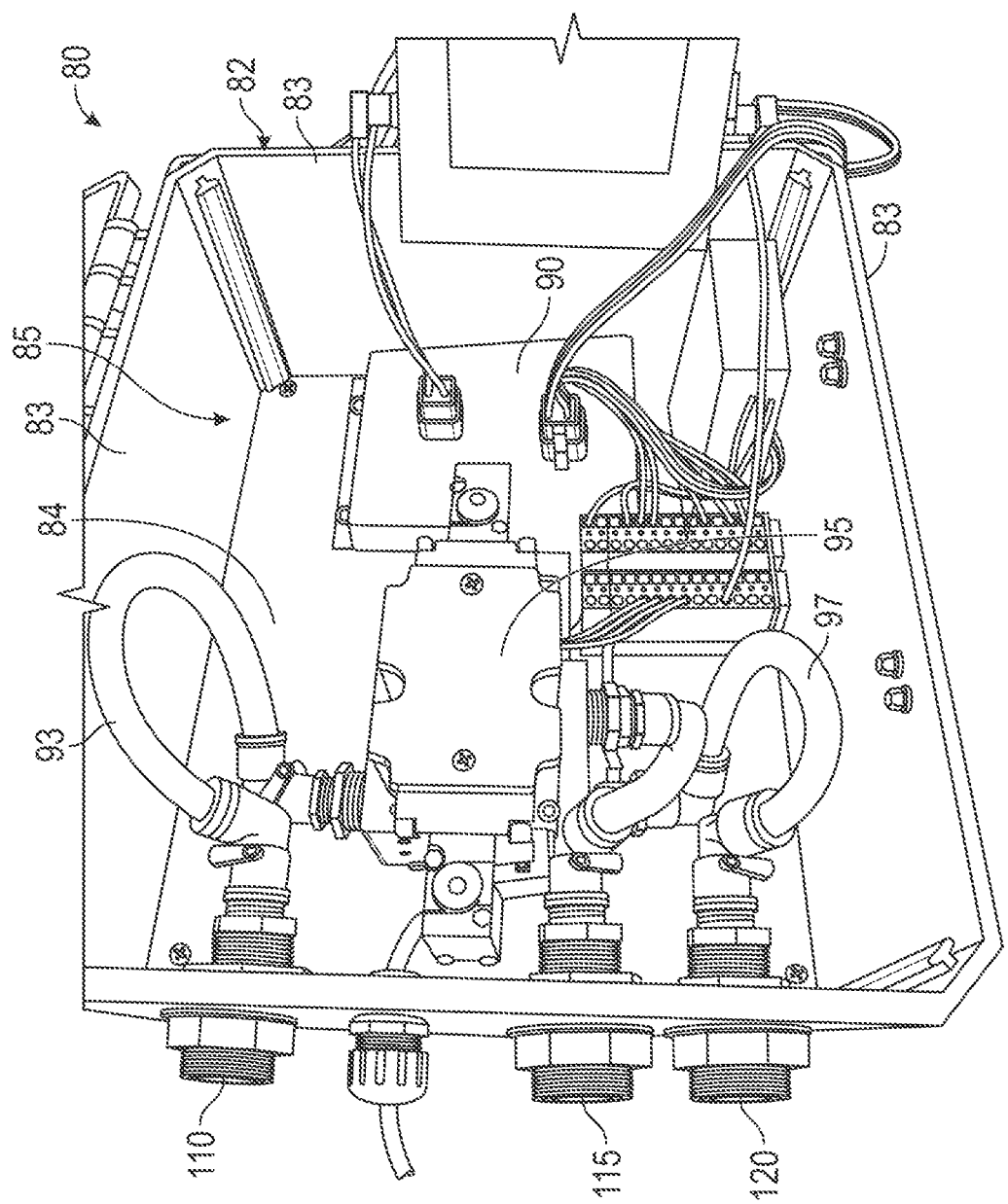
FIG. 3 is a detailed view of the controller of the present invention.

Illustrated in particular in FIG. 3 herein is the controller 80. The controller 80 is operably coupled to the wheel assembly 10 and includes the necessary electronic and pneumatic components to facilitate the operation of the central tire inflation system 100. Controller 80 includes housing 82 that is formed from a rigid material such as but not limited to metal or plastic and is generally rectangular in shape having integrally formed walls 83 and a bottom 84 forming an interior volume 85. It should be noted that in FIG. 3 herein that a top for the controller 80 is not illustrated so as to show the internal components thereof. Disposed within the interior volume 85 of the housing 82 is central processing unit 90. The central processing unit 90 includes the necessary electronic components to store, receive, transmit and manipulate data to provide operation of the central tire inflation system 100. The central processing unit 90 is operable coupled to valve 95 and provides control thereof. Valve 95 is a conventional pneumatic valve that is pneumatically coupled to the wheel assembly 10 via the first port 110. The valve 95 is pneumatically coupled to a first port 110, a second port 115 and a third port 120. The valve 95 under operable control of the central processing unit 90 will direct airflow as required to achieve an input air pressure for tires operably coupled to the wheel assembly 10. The first port 110 is fluidly coupled to valve 95 utilizing tube 93. First port 110 is fluidly coupled to the wheel assembly 10 utilizing conventional hosing (not illustrated herein). In the event that a tire operably coupled to a wheel assembly 10 has a air pressure lower than that required, the valve 95 will move to a position such that the valve 95 will direct air flow into tube 93 and discharge from the first port 110 so as to be transported to the tire(s) so as to achieve the desired minimum air pressure. Third port 120 is operably coupled to a conventional air source such as but not limited to an air tank or an air compressor (not particularly illustrated herein). When an increase in air pressure for a tire(s) operably coupled to a wheel assembly 10 is required, the valve 95 is positioned so as to receive air from the third port 120 and discharge air from the first port 110. The third port 120 is fluidly coupled to the valve 95 utilizing tube 97. In the inflate mode of the central tire inflation system 100 the valve 95 will intake air from an air source via third port 120 and discharge air via the first port 110 which is directed to the tires having the wheel assembly 10 operably coupled thereto. The valve 95 further includes an integrated pressure sensor (not illustrated herein) that monitors the air pressure within the central tire inflation system 100 and will provide either inflation or deflation of the tires operably coupled to the wheel assembly 10 as needed.

In the deflate mode, the controller 90 will provide deflation of the tires operably coupled to the wheel assembly 10. As will be further discussed herein, the central tire inflation system 100 provides a user the ability to both inflate and deflate the tires programmatically through a control panel 150. In the deflate mode, the valve 95 is positioned so as to permit airflow inward from the first port 110 and is discharged through the second port 115. The second port 115 is a discharge port that is atmospherically coupled to the external environment wherein the air received from the first port 110 in the deflate mode is discharged into the environment via the second port 115.

Figure 4:
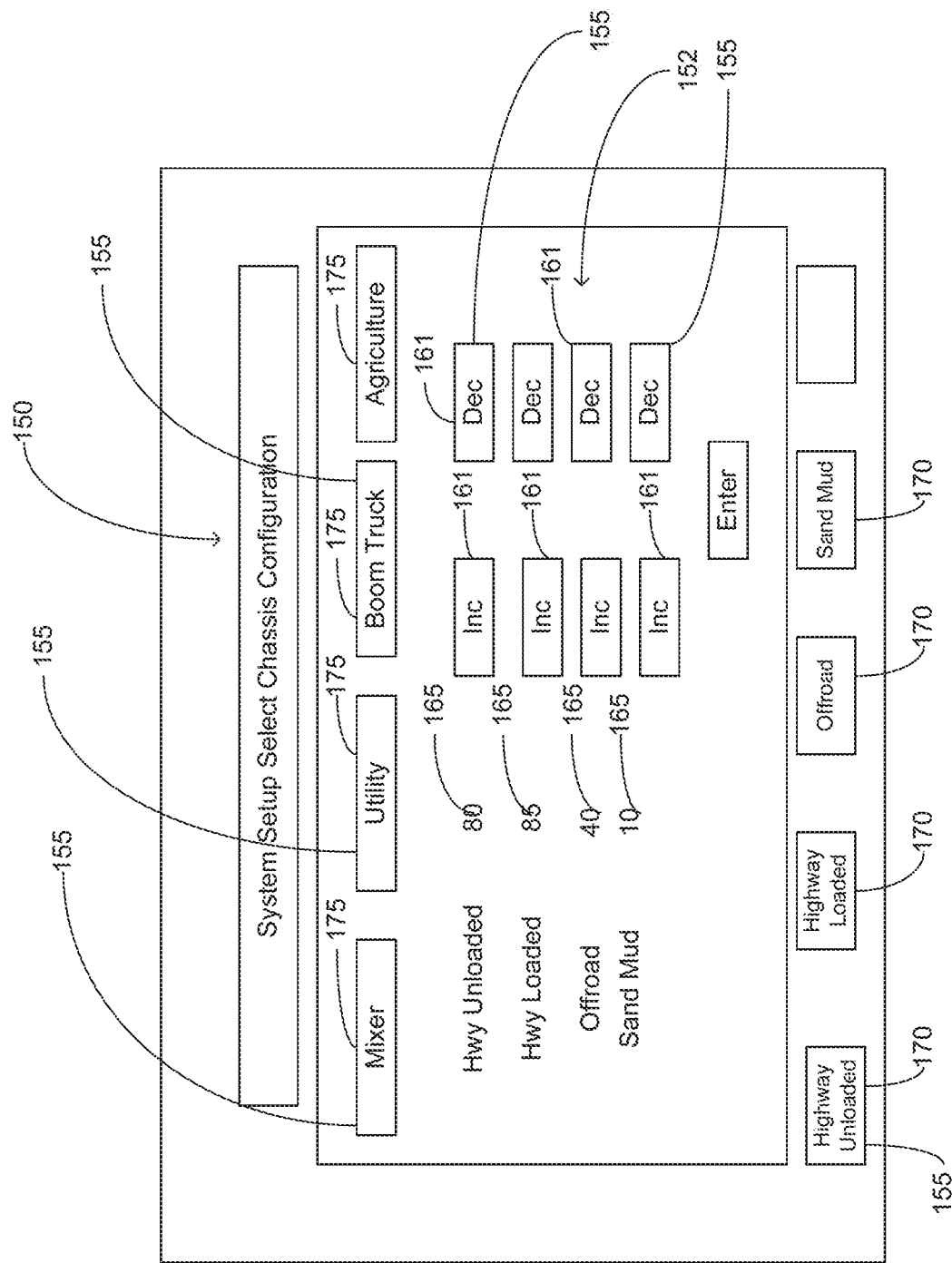
FIG. 4 is a diagrammatic view of the control panel and an exemplary screen display of the present invention.

Referring to FIG. 4 herein, a diagrammatic view of the control panel 150 is illustrated therein. The control panel 150 includes a graphical display 152 having a plurality of icons 155 and functions to provide the user interface for a user to operate the central tire inflation system 100. The graphical display 152 is a conventional touch screen interface and the control panel 150 is operably coupled to controller 80. Icons 175 are vehicle type icons. The central tire inflation system 100 is designed to be installed on various vehicle types that are utilized in alternate industries so as to execute a desired task. By way of example but not limitation, the central tire inflation system 100 can be mounted to a concrete mixer truck or a power utility truck. Both of the aforementioned vehicle types operate in different conditions and traverse across various terrains during execution of the intended functionality for that vehicle type. As such, the required tire pressure for the tires on the aforementioned vehicles must not only maintain a minimum air pressure but it is further desired that the operator of the vehicle be able to alter the air pressure within the tires depending upon the type of surface the vehicle is being driven on and what type of load the vehicle may be subjected to during operation. The vehicle type icons 175 provide the user of the central tire inflation system 100 to set desired tire air pressure through engagement of just the vehicle type icon and the default parameters stored in the central processing unit 90 for the vehicle type activated and initiated. While the graphical display 152 control panel 150 has illustrated herein four vehicle type icons 175 and further has exemplary vehicle types listed thereon, it is contemplated within the scope of the present invention that the control panel 150 could have more or less than four vehicle type icons 175 and could further have alternate vehicle types and parameters therefore programmed into the central processing unit 90.

The graphical display 152 further has displayed thereon adjustment icons 161. The adjustment icons 161 have indicia therein indicating increase or decrease more specifically abbreviations, Inc and Dec. The adjustment icons 161 provide a technique to a user to adjust the default tire air pressure for the current mode displayed on the graphical display 152. In the exemplary parameters illustrated in FIG. 4 herein, the recommended highway unloaded tire air pressure that is desires, set and monitored is 80 PSI. If a user desires to alter the default setting of 80 PSI, the user will engage the adjustment icons 161 so as to increase and/or decrease the default PSI setting. Ensuing the adjustment of the default air pressure, the central processing unit 90 stores the adjusted values for the default air pressure. It is contemplated within the scope of the present invention that the tire air pressure parameter settings 165 can be adjusted and stored in the central processing unit 90. It is further contemplated within the scope of the present invention that the central tire inflation system 100 could require a password in order to permit a user to execute the aforementioned adjustments to default air pressure. It should be understood that FIG. 4 depicts a system setup screen display for the central tire inflation system 100. It is further contemplated within the scope of the present invention that numerous alternate screens will be displayed on the graphical display 152 of the control panel 150. These alternate screens are further discussed herein and include but are not limited to a warning screen, a fault log screen, a diagnostic screen and a manual control screen. Still referring to FIG. 4, the graphical display 152 of the control panel 150 further includes mode selection icons 170. The mode selection icons 170 provide a user an interface to identify and select the driving mode in which the vehicle that the central tire inflation system 100 is operably coupled. Each alternate mode has associated therewith tire air pressure parameters and subsequent selection and activation of the mode, the central processing unit 90 will initiate the central tire inflation system 100 to inflate and/or deflate the tire air pressure according to the parameters associated with the selected mode. By way of example but not limitation, it is contemplated that the central tire inflation system 100 provides operational modes such as highway loaded, highway unloaded, off-road or sand-mud mode. These aforementioned operational modes have associated therewith pre-programmed tire air pressure parameters designed for the operational mode so as to provide the correct tire air pressure for the application of use. Furthermore, ensuing selection of the mode and activation thereof, the central processing unit 90 will continuously monitor the tire air pressure and make adjustments thereto in order to maintain the parameter settings for the selected mode. Additionally, each deviation from the tire air pressure parameters associated with active selected mode is recorded and stored in a fault log database within the central processing unit 90 for subsequent access thereto.

Figure 5:
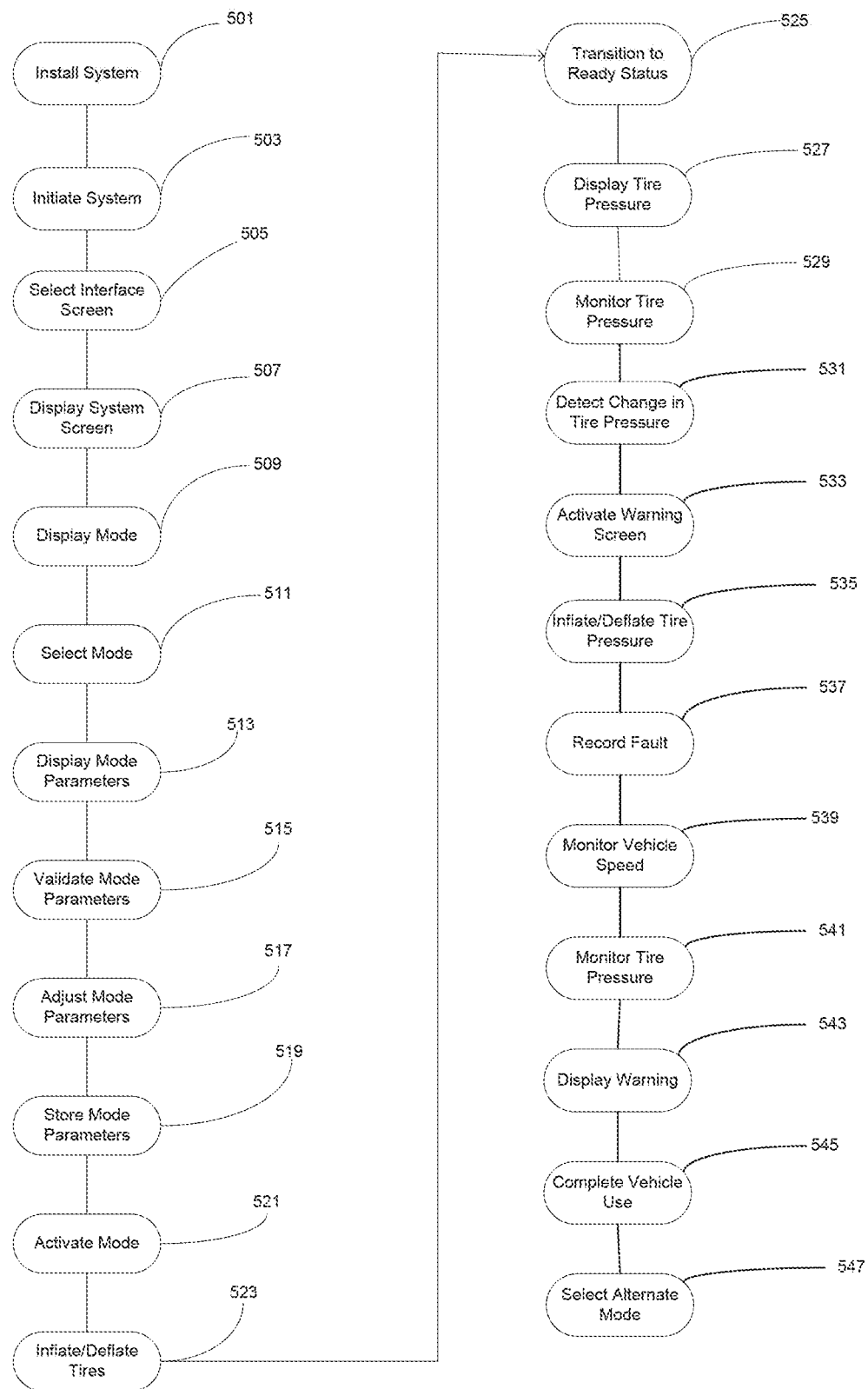
FIG. 5 is a flow chart of an exemplary method of use of the present invention.

Referring now to FIG. 5 herein, a method of operation of the central tire inflation system 100 is as follows. In step 501, the central tire inflation system 100 is installed on a vehicle such as but not limited to a commercial truck. Installation of the central tire inflation system 100 includes but is not limited to tasks such as mounting the wheel assembly 10 to the tires of the commercial truck and placing the controller 80 and control panel in the passenger compartment thereof. In step 503, the central tire inflation system 100 is initiated wherein the central processing unit 90 is activated and the control panel 150 is utilized to commence system operation. Step 505, the user will be provided an interface screen to continue operation of the central tire inflation system 100, wherein the interface screen is at least one of the following: a diagnostic screen, a warning screen, a fault log screen, a manual control screen and a system set up screen. In step 507, a user will select the system set up screen, which has been illustrated herein in FIG. 5. Step 509, the control panel 150 will display both vehicle type icons 175 and mode selection icons 170. In step 511, a user will select a vehicle type and a mode of use as previously discussed herein. Step 513, the control panel 150 will display the mode parameters on the graphical display 152. In step 515, the user will be prompted to validate the mode parameters that have been displayed on the graphical display 152. Step 517, the user may either validate the mode parameters or adjust the mode parameters utilizing the adjustment icons 161. It should be understood within the scope of the present invention that only an authorized user with a password can make adjustments to the mode parameters utilizing the adjustment icons 161. In step 519, if the mode parameters were adjusted utilizing the adjustment icons 161, the central processing unit 190 records and stores the adjusted mode parameters.

Step 521, the user will activate the selected mode and the central tire inflation system 100 will initiate operation. In step 523, the central tire inflation system 100 will detect an initial tire air pressure and will either inflate or deflate the tires as necessary so as to align with the mode parameters activated. Step 525, the central tire inflation system 100 will transition to an initial ready status wherein the tires have been adjusted to the air pressure as defined in the selected mode. In step 527, the central tire inflation system 100 will display the current tire pressure on the graphical display 152. Step 529, the central tire inflation system 100 will continuously monitor the tire air pressure on which the central tire inflation system 100 is installed. In step 531, the valve 95 having the integrated pressure sensor detects a pressure in a tire that has deviated from the tire air pressure parameter in the active mode. Step 533, the central processing unit 90 transmits a signal to the control panel 150 to display a warning signal on the graphical display that a tire has an air pressure that has deviated from the stored parameters for the active mode. In step 535, the central processing unit 90 transmits a signal to the valve 95 to initiate either inflation or deflation of the tires so as to return the tire air pressure to the tire pressure parameter of the active mode. Step 537, the central processing unit 90 records the deviation and stores in the memory thereof particularly in a fault log database for future access by a user. In step 539, the central tire inflation system 100 continues to monitor the tire air pressure of the vehicle and further monitors the speed of the vehicle. It is contemplated within the scope of the present invention that the central tire inflation system 100 could be operably integrated into the speedometer of the vehicle so as to extract the vehicle speed and display on the graphical display 152 of the control panel 150. Those skilled in the art should recognize that the vehicle speed could be obtained utilizing alternate devices and/or techniques. In step 541, the central tire inflation system 100 continues to monitor the tire pressure and compare to the tire pressure parameters of the active mode. Step 543, the central tire inflation system 100 will display a warning if the vehicle speed exceeds the recommended speed for the active mode. The warning signal is generated by the central processing unit 90 and is transmitted to the control panel 150 for display to the user. In step 545, the user completes the vehicle use. In step 547, a second user will select a mode in which the user will begin to utilize the vehicle to which the central tire inflation system 100 is mounted. The aforementioned second user could be the same individual initiating re-use of the vehicle. Operation of the central tire inflation system 100 returns to step 513 and resume all of the aforementioned steps of operation through step 513 to step 545.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

The invention claimed is:

1. A central tire inflation system configured to monitor and maintain an air pressure on at least one tire of a vehicle comprising:
    a housing operably coupled to the at least one tire and having a plurality of walls and a bottom forming an interior volume;
    a valve assembly disposed within the interior volume of the housing and configured to receive a signal from a controller to direct air flow as required into or out of the at least one tire to adjust an actual air pressure, the valve being operably coupled to the controller, wherein the valve assembly is fluidly coupled to the at least one tire and further comprises:
        a seat cup, an upper seal and spring group located on a first side of the seat cup, and a lower seal and spring group located on a second side of the seat cup;

the controller having a target air pressure and adapted to control the valve assembly to maintain the actual air pressure within the tires of the vehicle at the target air pressure; and a graphical display in electrical communication with the controller and comprising:

a first icon associated with a first value of the target air pressure, a second icon associated with a second value of the target air pressure, and wherein the graphical display is adapted to receive a user selection of the first icon or the second icon and provide the controller an indication when either the first icon or the second icon is selected;

wherein the controller sets the target air pressure to the first value when the first icon is selected; and wherein the controller sets the target air pressure to the second value when the second icon is selected.

2. The central tire inflation system of claim 1 further comprising an air pressure sensor carried by the housing and operable to detect the actual air pressure of the at least one tire of the vehicle.

3. The central tire inflation system of claim 2 wherein the graphical display is adapted to display the actual tire pressure.

4. The central tire inflation system of claim 1 wherein the graphical display further comprises an increase adjustment icon adapted to receive a user selection and provide the controller an indication to increase the target air pressure.

5. The central tire inflation system of claim 1 wherein the graphical display further comprises a decrease adjustment icon adapted to receive a user selection and provide the controller an indication to decrease the target air pressure.

6. The central tire inflation system of claim 5 wherein the controller further comprises minimum target air pressure and is adapted to prevent decreasing the target air pressure below the minimum target air pressure.

7. The central tire inflation system of claim 1 wherein the first icon is associated with a first terrain and the second icon is associated with a second terrain.

8. The central tire inflation system of claim 1 wherein the first icon is associated with a first vehicle load and the second icon is associated with a second vehicle load.

9. The central tire inflation system of claim 1 wherein the first icon is associated with a first mode, having a first terrain and first vehicle load, and the second icon is associated with a second mode, having a second terrain and second vehicle load.

10. The central tire inflation system of claim 1 further comprising a speed measuring device adapted to provide a vehicle speed to the controller.

11. The central tire inflation system of claim 10 wherein the graphical display is adapted to display the vehicle speed.

12. The central tire inflation system of claim 10 wherein the first icon is further associated with a first speed and the second icon is further associated with a second speed;

wherein the controller has a maximum speed;

wherein the controller sets the maximum speed to the first speed when the first icon is selected;

wherein the controller sets the maximum speed to the second speed when the second icon is selected; and wherein the graphical display is adapted to display a warning when the vehicle speed exceeds the maximum speed.

13. A central tire inflation system configured to monitor and maintain an air pressure on at least one tire of a vehicle comprising:

a housing operably coupled to the at least one tire and having a plurality of walls and a bottom forming an interior volume;

a valve assembly disposed within the interior volume of the housing and configured to receive a signal from a controller to direct air flow as required into or out of the at least one tire to adjust an actual air pressure, the valve being operably coupled to the controller, wherein the valve assembly is fluidly coupled to the at least one tire and further comprises:

a seat cup, an upper seal and spring group located on a first side of the seat cup, and a lower seal and spring group located on a second side of the seat cup;

an air pressure sensor carried by the housing and operable to detect the actual air pressure of the at least one tire of the vehicle;

the controller having a target air pressure and adapted to control the valve assembly to maintain the actual air pressure within the tires of the vehicle at the target air pressure; and a graphical display in electrical communication with the controller and comprising:

a first icon associated with a first value of the target air pressure, a second icon associated with a second value of the target air pressure, and wherein the graphical display is adapted to receive a user selection of the first icon or the second icon and provide the controller an indication when either the first icon or the second icon is selected;

wherein the controller sets the target air pressure to the first value when the first icon is selected; and wherein the controller sets the target air pressure to the second value when the second icon is selected.

14. The central tire inflation system of claim 13 wherein the first icon is associated with a first terrain and the second icon is associated with a second terrain.

15. The central tire inflation system of claim 13 wherein the first icon is associated with a first vehicle load and the second icon is associated with a second vehicle load.

16. The central tire inflation system of claim 13 wherein the first icon is associated with a first mode, having a first terrain and first vehicle load, and the second icon is associated with a second mode, having a second terrain and second vehicle load.

17. The central tire inflation system of claim 13 further comprising a speed measuring device adapted to provide a vehicle speed to the controller.

18. The central tire inflation system of claim 17 wherein the first icon is further associated has a first speed and the second icon is further associated with a second speed;

wherein the controller has a maximum speed;

wherein the controller sets the maximum speed to the first speed when the first icon is selected;

wherein the controller sets the maximum speed to the second speed when the second icon is selected; and wherein the graphical display is adapted to display a warning when the vehicle speed exceeds the maximum speed.

19. A central tire inflation system configured to monitor and maintain an air pressure on at least one tire of a vehicle comprising:
- a housing operably coupled to the at least one tire and having a plurality of walls and a bottom forming an interior volume;
- a valve assembly disposed within the interior volume of the housing and configured to receive a signal from a controller to direct air flow as required into or out of the at least one tire to adjust an actual air pressure, the valve being operably coupled to the controller, wherein the valve assembly is fluidly coupled to the at least one tire and further comprises:
  - a seat cup,
  - an upper seal and spring group located on a first side of the seat cup, and
  - a lower seal and spring group located on a second side of the seat cup;
- an air pressure sensor carried by the housing and operable to detect the actual air pressure of the at least one tire of the vehicle;
- the controller having a target air pressure and a maximum speed and adapted to control the valve assembly to maintain the actual air pressure within the tires of the vehicle at the target air pressure;
- a speed measuring device adapted to provide a vehicle speed to the controller; and
- a graphical display in electrical communication with the controller and comprising:
  - a first icon associated with a first value of the target air pressure and a first speed,
  - a second icon associated with a second value of the target air pressure a second speed, and
  - wherein the graphical display is adapted to receive a user selection of the first icon or the second icon and provide the controller an indication when either the first icon or the second icon is selected;
- wherein the controller sets the target air pressure to the first value and sets the maximum speed to the first speed when the first icon is selected;
- wherein the controller sets the target air pressure to the second value and sets the maximum speed to the second speed when the second icon is selected;
- wherein the graphical display is adapted to display the actual tire pressure; and
- wherein the first icon is associated with a first mode, having a first terrain and first vehicle load, and the second icon is associated with a second mode, having a second terrain and second vehicle load.

* * * * *

UNITED STATES PATENT AND TRADEMARK OFFICE
CERTIFICATE OF CORRECTION

| | | |
|---|---|---|
| PATENT NO. | : 11,529,831 B2 | Page 1 of 1 |
| APPLICATION NO. | : 16/700082 | |
| DATED | : December 20, 2022 | |
| INVENTOR(S) | : Dunst et al. | |

It is certified that error appears in the above-identified patent and that said Letters Patent is hereby corrected as shown below:

On the Title Page

Item (12), should read: Dunst et al.

Item (72), should read:
Bradley Dunst, Christmas, FL (US);
Mark Oostdyk, Cocoa FL (US)

Signed and Sealed this
Twenty-ninth Day of July, 2025

Coke Morgan Stewart
*Acting Director of the United States Patent and Trademark Office*